(12) United States Patent
Mulbrook et al.

(10) Patent No.: US 7,639,178 B1
(45) Date of Patent: Dec. 29, 2009

(54) SYSTEM AND METHOD FOR DETECTING RECEIVERS

(75) Inventors: Mark M. Mulbrook, Marion, IA (US); Gary E. Lehtola, Alburnett, IA (US); Donald F. Hovda, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/267,047

(22) Filed: Nov. 4, 2005

(51) Int. Cl.
*G01S 7/41* (2006.01)

(52) U.S. Cl. ................. 342/146; 342/127; 342/128; 342/193

(58) Field of Classification Search ........... 342/146
See application file for complete search history.

(56) References Cited

U.S. PATENT DOCUMENTS

| | | | | |
|---|---|---|---|---|
| 4,384,281 A * | 5/1983 | Cooper | ........... | 340/572.2 |
| 5,191,343 A * | 3/1993 | Danzer et al. | ........... | 342/21 |
| 6,057,765 A * | 5/2000 | Jones et al. | ........... | 340/572.2 |
| 6,163,259 A * | 12/2000 | Barsumian et al. | ........... | 340/572.2 |
| 6,680,691 B2 * | 1/2004 | Hager et al. | ........... | 342/127 |
| 6,765,527 B2 * | 7/2004 | Jablonski et al. | ........... | 342/193 |
| 6,897,777 B2 * | 5/2005 | Holmes et al. | ........... | 340/572.2 |
| 2003/0179126 A1 * | 9/2003 | Jablonski et al. | ........... | 342/22 |
| 2004/0095243 A1 * | 5/2004 | Holmes et al. | ........... | 340/572.2 |
| 2004/0252047 A1 * | 12/2004 | Miyake et al. | ........... | 342/107 |

* cited by examiner

*Primary Examiner*—Thomas H Tarcza
*Assistant Examiner*—Matthew M Barker
(74) *Attorney, Agent, or Firm*—Matthew J. Evans; Daniel M. Barbieri

(57) ABSTRACT

The present invention is a system and method for detecting devices with receivers, such as explosive devices with receivers used to remotely detonate the explosive devices. The system for detecting devices may include a transmitter which transmits a signal causing saturation of a device whereby harmonic content is emitted by the device. Receipt of an emitted harmonic signal which is coherent to the transmitted signal may indicate the presence of a device. A distance between the system and the detected device may be determined by modulating a frequency of the transmitted signal and measuring the time period between transmission of the signal and receipt of a harmonic signal. Additionally, direction information may be determined which may allow identification of a location of the device based upon the distance information and direction information.

10 Claims, 5 Drawing Sheets

SYSTEM AND METHOD FOR DETECTING RECEIVERS

FIELD OF THE INVENTION

The present invention relates generally to security threat detection, and more particularly to a system and method of detecting the presence of radio controlled detonators.

BACKGROUND OF THE INVENTION

In order to maintain a safe environment for individuals, security measures are executed to prevent the occurrence of security threats. One of the most important aspects of a security policy is the detection of a security threat prior to its occurrence. For example, one type of security risk is the use of a home-made bomb or an improvised explosive device (IED). Home-made bombs and improvised explosive devices may refer to explosive devices that include an explosive charge and detonator. Typically, home-made bombs and improvised explosive devices are used in unconventional warfare by terrorists or guerilla forces.

Security measures for explosive devices include the detection of the explosive device and identification of the location of the explosive device prior to the detonation of the explosive device. Upon detection and identification of a location of the explosive device, the explosive device may be disassembled or may be safely detonated. Conventional methods for detection of explosive devices include explosive trace detection devices which detect vapors and particles of explosives from surfaces. However, explosive trace detection devices must be placed in proximity to a device by user personnel to determine if the device contains explosives. This places user personnel in close proximity with the explosive device and further increases the risk of harm to personnel. Consequently, an improved system and method for detecting the presence of an explosive device is necessary.

SUMMARY OF THE INVENTION

Accordingly, the present invention is directed to a system and method for detecting devices with wireless receivers, particularly receivers employed as the detonation for explosive devices. In one embodiment of the invention, the system for detecting devices may include a transmitter which transmits a signal causing saturation of a device whereby harmonic content is emitted by the device. Receipt of an emitted harmonic signal which is coherent to the transmitted signal may indicate the presence of a device with a receiver. A distance between the system and the detected device may be determined by modulating a frequency of the transmitted signal and measuring the time period between transmission of the signal and receipt of a harmonic signal. Additionally, direction information may be determined which may allow identification of a location of the device based upon the distance information and direction information.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Referring generally to FIGS. 1-5, embodiments of a system and method for detecting a device with a receiver are shown. In one embodiment of the invention, devices such as explosive devices employing wireless data detonation through wireless communication devices such as radios, cell phones and the like may be detected prior to the detonation of the explosive device. Any type of device with a wireless receiver may be detected without prior knowledge of a frequency plan of the wireless receiver. Additionally, the system and method for detecting devices may provide a precise location of the detected device, allowing security personnel to dismantle the explosive device or allow for safe detonation of the device.

Figure 1:
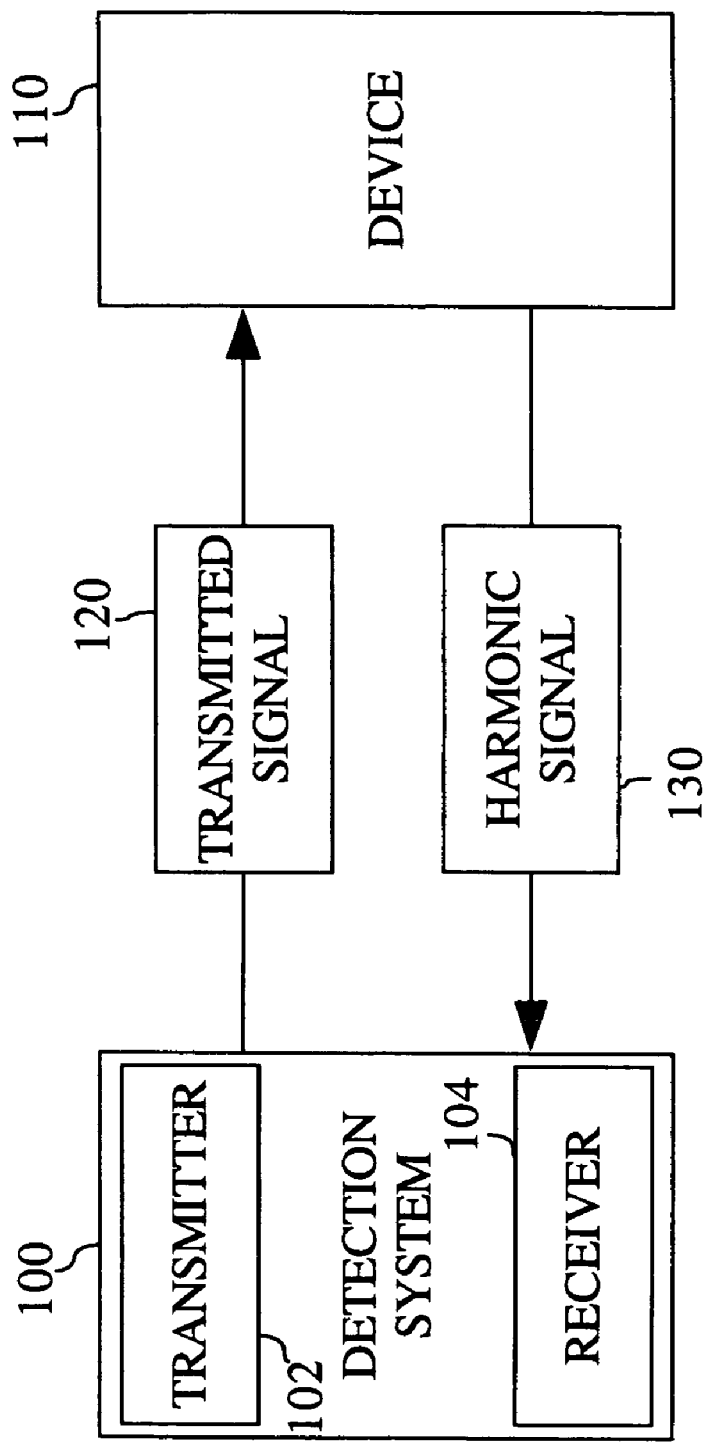
FIG. 1 depicts a system for detecting the presence of a device in accordance with an embodiment of the present invention.

Referring to FIG. 1, a system 100 for detecting the presence of a device 110 in accordance with an embodiment of the present invention is shown. Detection system 100 may include a transmitter 102 and at least one receiver 104. Transmitter 102 may be suitable for transmitting a signal 120 which saturates a receiver of device 110. Saturation of a receiver of device 110 may occur when the output of a linear device, such as a front end amplifier of the receiver, deviates from being a linear function of the input signal when the power of the input signal is increased. A signal 120 which saturates a receiver of device 110 may be at a frequency within a passband of the receiver of device 110 whereby the input power of the signal causes saturation of an amplifier of the device receiver. A passband of a receiver may refer to a portion of a spectrum, between limiting frequencies, where signals may pass minimum relative loss or maximum relative gain.

When device 110 has been saturated by a signal 120, the excess signal power may create distortion and the device 110 may emit a harmonic signal 130. A harmonic signal 130 may refer to a signal or wave whose frequency is an integral or whole-number multiple of the frequency of a reference signal. For example, a second harmonic signal may be a signal at double the frequency of an input signal. For example, an input signal of 900 MHz may produce a second harmonic signal of 1800 MHz. Consequently, an emitted harmonic signal 130 may be coherent with signal 120 when the emitted harmonic signal is a whole-number multiple of the frequency of signal 120.

It is contemplated that transmitter 102 may be capable of variable frequency signals. This may be advantageous as it may allow the ability to detect a wide variety of devices with varying receiver passbands. For example, device 110 may include wireless data transfer devices such as cell phones, pagers, family radio service (FRS) radios, wireless doorbells, remote controls and the like. When the receiver passband of a device is saturated with signal 120, a harmonic signal may be radiated from the printed circuit board of the device 110. The receipt of an emitted harmonic signal 130 which is coherent with signal 120 may indicate the presence of device 110 within the range of signal 120.

In an exemplary embodiment of the invention, a device may be operating at 900 MHz. In order to saturate the device at a range of 100 meters, −10 dBm of input power at the receiver may be required. Received signal strength of the second harmonic signal may be −138 dBm. This may provide a 34 dB signal to noise ratio in a 1 Hertz (Hz) bandwidth. Advantageously, the receiver of system 100 may include a narrow measurement bandwidth while monitoring for coherent harmonic signals and may provide a usable signal to noise ratio. The power required to provide −10 dBm at the front end of a device over 100 meters may be achieved with transmitter power of 160 Watts.

Figure 2:
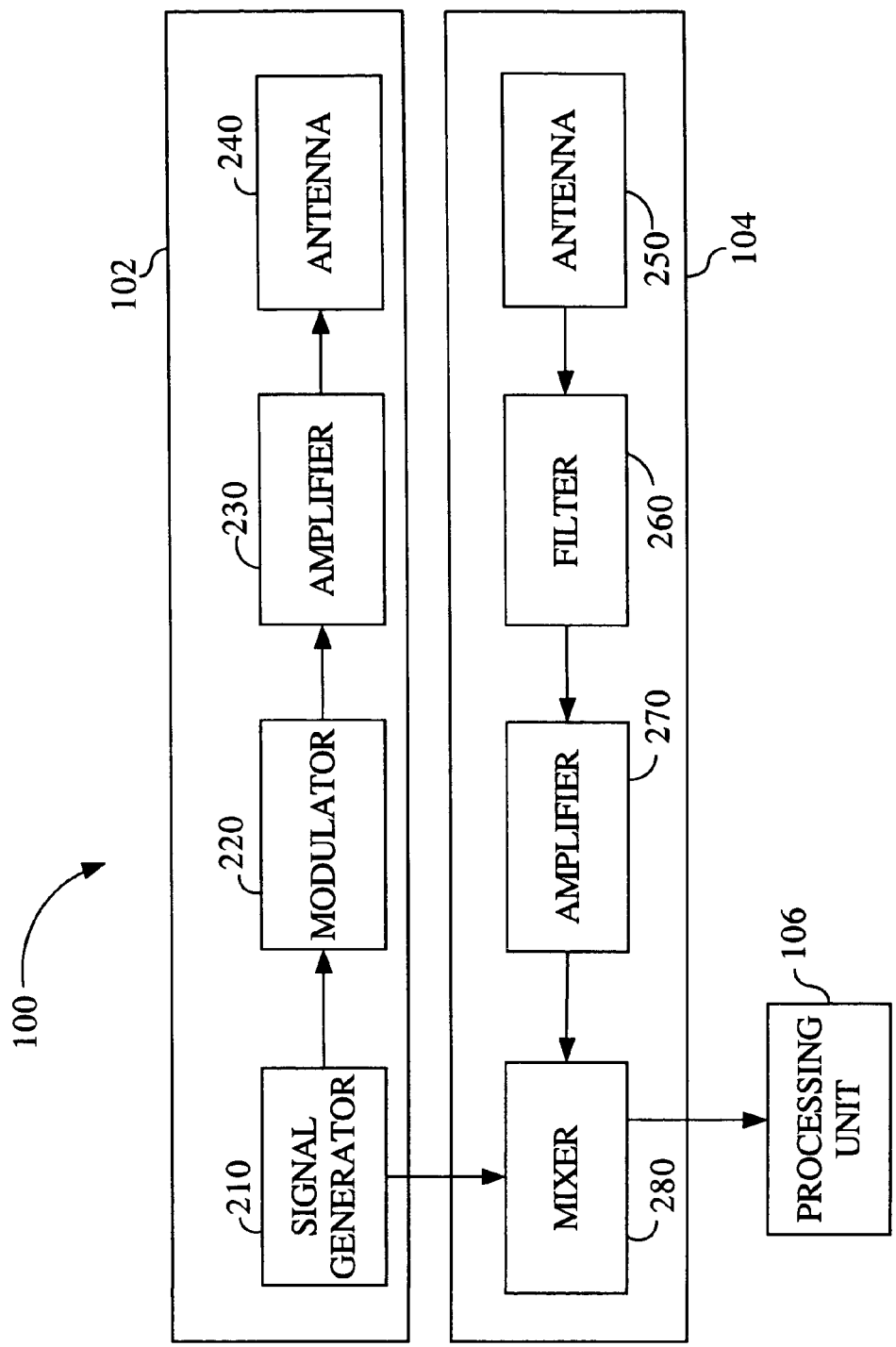
FIG. 2 depicts a block diagram of a system for detecting the presence of a device in accordance with an embodiment of the present invention.

Referring to FIG. 2, a block diagram of system 100 for detecting the presence of a device in accordance with an embodiment of the present invention is shown. System 100 may include a transmitter 102, receiver 104 and processing unit 106. Transmitter 102 may include a signal generator 210, such as an oscillator, modulator 220, amplifier 230, such as a power amplifier, and an antenna 240. Modulator 220 may encode a signal for transmission to allow a time period measurement for receipt of an emitted harmonic signal. Receiver 104 may include an antenna 250, filter 260, amplifier 270, such as a low noise amplifier, and a mixer 280. In order to achieve usable signal to noise ratios for the received harmonic signals, receiver 104 may be implemented with filter 260, allowing a narrow passband.

Processing unit 106 may refer to components, hardware and software that may process the received harmonic signal. It is contemplated that processing unit 106 may measure a time period from transmission of a modulated signal to the receipt of an emitted harmonic signal. The measured time period may be utilized to compute a distance between the system 100 and a detected device. Additionally, system 100 may include an additional receiver. An additional receiver may be employed with processing unit 106 to determine direction information. An angle of an emitted harmonic signal may be determined from an attached directional antenna or by measuring a phase difference between multiple receivers. With distance information and direction information, a precise location of the detected device may be determined by processing unit 106.

It is contemplated that multiple implementations exist for system 100 including processing unit 106. For example, processing unit 106 may include a network analyzer implementation, a direct sequence spread spectrum implementation and a frequency modulated continuous wave radar implementation. A network analyzer implementation may include the incorporation of a network analyzer, such as a Hewlett Packard Model 8753D, and the like. In such an implementation, a network analyzer may provide a sweeping synthesized signal generation whereby magnitude information, phase information and time domain measurements may be provided. For example, the network analyzer may be capable of measuring the time period between transmitting a signal and receiving an emitted harmonic signal from a device.

Additionally, through time gating, a radio frequency passband representation of a device may be produced. A passband representation may reflect the characteristic qualities of a front end filter of a receiver. A passband representation may act as a fingerprint for a wireless device whereby similar types of wireless devices may have a similar passband representation. When a potential device has been detected, a passband representation may be produced and compared against known passband representations to determine if the device is a threat device. In such a fashion, the passband representation may be employed to distinguish a receiver from a stray semiconductor junction, such that formed by dissimilar metals in towers and road signs.

Figure 3:
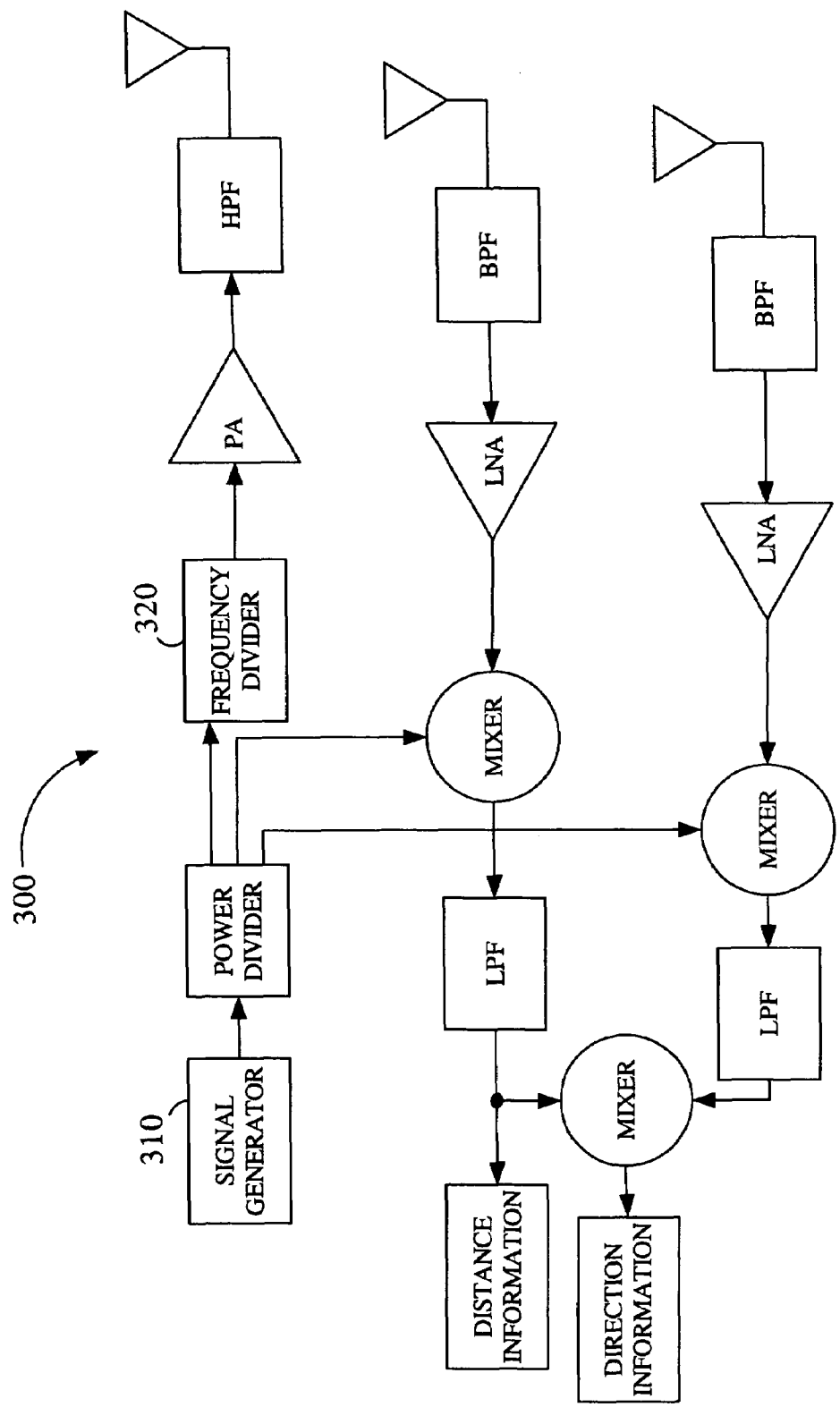
FIG. 3 depicts a frequency modulated continuous wave detection system in accordance with an embodiment of the present invention.
Figure 4:
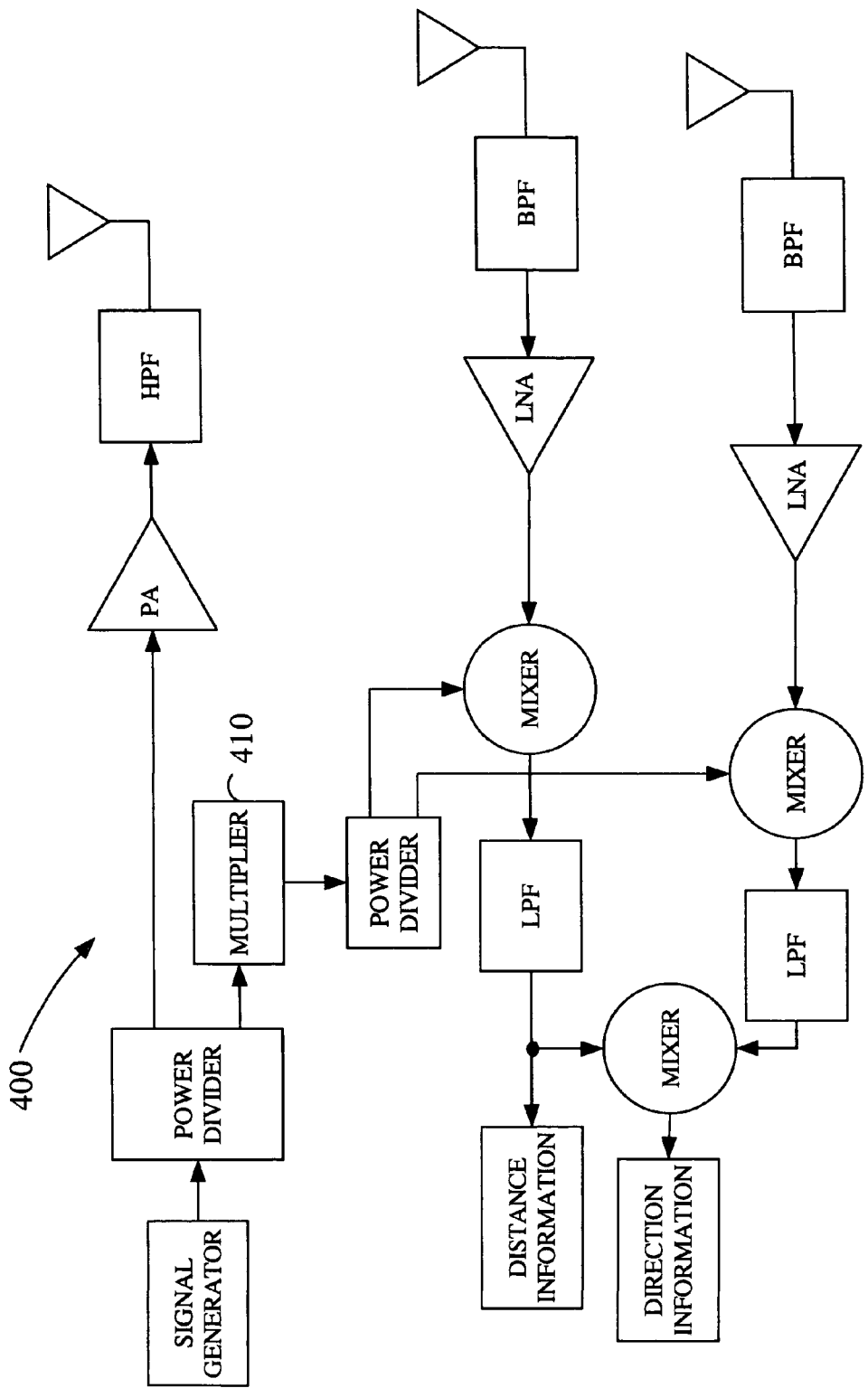
FIG. 4 depicts a frequency modulated continuous wave detection system in accordance with an alternative embodiment of the present invention.

A frequency modulated continuous wave (FWCW) implementation may operate similar to a frequency modulated continuous wave radar topology, wherein the system is tuned to receive an emitted harmonic signal from a device. Referring to FIGS. 3 and 4, embodiments of a system for detecting the presence of a device according to a frequency modulated continuous wave implementation are shown. Referring to FIG. 3, a frequency modulated continuous wave detection system 300 in accordance with an embodiment of the present invention is shown. The signal generator 310 may produce a variable frequency signal which may be divided by frequency divider 320 depending upon the harmonic signal being monitored. For example, when a second harmonic signal is being monitored, frequency divider would divide the input frequency by a factor of two. Referring to FIG. 4, a frequency modulated continuous wave detection system 400 in accordance with an alternative embodiment of the present invention is shown. Frequency modulated continuous wave detection system 400 may operate similarly to frequency modulated continuous wave detection system 300 while employing a multiplier 410 which is based upon the harmonic signal being monitored. For example, when a third harmonic signal is being monitored, multiplier multiplies the input signal by a factor of three.

It is contemplated that frequency modulated continuous wave systems 300, 400 of FIGS. 3-4 may also provide a passband representation of a device. By sweeping a frequency signal of the transmitted signal across the passband, a passband representation may be produced from the emitted harmonic signals of the device.

It is further contemplated that system 100 of FIG. 1 and systems 300, 400 of FIGS. 3-4 respectively may be employed with a visual display including graphical user interface. In one embodiment of the invention, a detection system in accordance with the present invention may be implemented within a global positioning system (GPS) receiver. It is contemplated that the detection system of the present invention may operate in conjunction with a GPS receiver system whereby a location of a potential threat may be displayed within a graphical display to aid a user in the search for the detected device.

Figure 5:
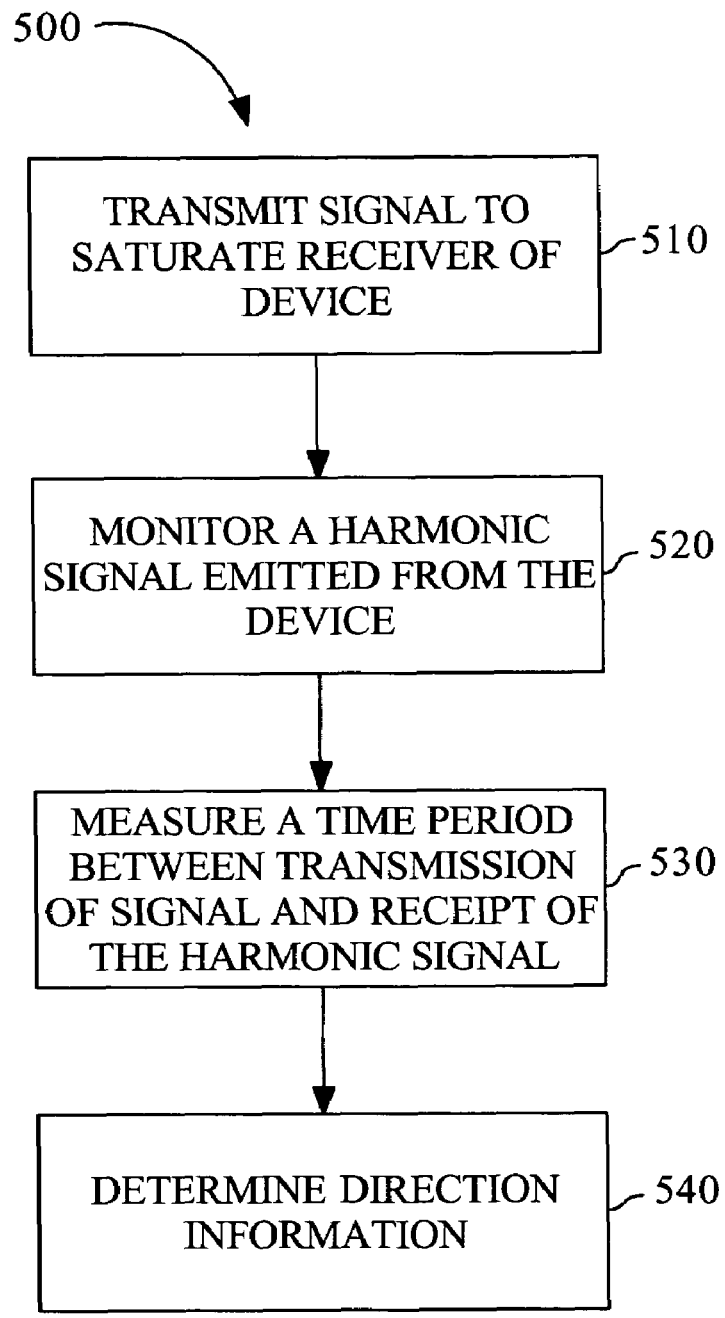
FIG. 5 depicts a flowchart representing a method for detecting the presence and location of a device in accordance with an embodiment of the present invention.

Referring to FIG. 5, a method 500 for detecting the presence and location of a device in accordance with an embodiment of the present invention is shown. It is contemplated that system 100 of FIG. 1 and systems 300, 400 of FIGS. 3-4 respectively may execute method 500 for detecting the presence and location of a device. Method 500 may begin by transmitting a signal 510. It is contemplated that the transmitted signal is suitable for saturating a receiver of a device whereby the signal is at a frequency within a passband of the receiver of the device. It is further contemplated that saturating a receiver may refer to the condition when a receiver amplifier deviates from being a linear function. After a signal is transmitted, an emitted harmonic signal from a device may be monitored 520. Receipt of an emitted harmonic signal which is coherent to a transmitted signal may indicate the presence of a device within a range of the signal. Monitoring of the emitted harmonic signal may be achieved in a narrow bandwidth, for example 1 Hertz (Hz).

In an embodiment of the invention, method 500 may continue to include measuring a time period of the receipt of a coherent emitted harmonic signal 530. When a signal is transmitted under step 510, the signal may be modulated, for example, adding pseudo noise coding to the signal. A distance between a device and the location of the transmission of signal may be proportional to a time period in which an emitted harmonic signal is received. Direction information about the device may also be determined 540, by measuring the phase difference of an emitted harmonic signal between two antennas or through use of a directional antenna. With direction information and distance information, a precise location of a device may be determined.

While embodiments of a system for detecting a device include a single transmitter and one to two receivers, it is contemplated that a multiple receiver system may be employed which may be suitable for receiving a second harmonic signal, third harmonic signal, fourth harmonic signal and the like within the same system. This may allow for a more precise detection scheme whereby results of multiple harmonic signals may be correlated to provide enhanced detection capability, distance measurement, and direction determination.

While it is contemplated that the system and method for detecting a device may allow for dismantling of receiver-equipped explosive devices, it is further contemplated that the system may be employed for airport radio frequency detection, disaster victim search and recovery, and rescue missions without departing from the scope and intent of the present invention.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for detecting a device; comprising:
a transmitter, said transmitter configured to transmit a variable frequency signal to saturate a receiver of a device;
a first receiver, said first receiver suitable for receiving an emitted harmonic signal from the device,
a second receiver, said second receiver suitable for receiving said emitted harmonic signal from the device; and
a processing unit, the processing unit configured to measure a time period between transmission of said signal and receipt of the emitted harmonic signal from the device, said processing unit configured to determine a distance between said system and said device based upon said time period, said processing unit configured to determine a passband representation of said device by said transmitter sweeping a passband of said device upon detection of said device by transmitting multiple signals of various frequencies and determining which harmonic signals coherent to each transmitted signal are received by at least one of said first receiver and said second receiver.

2. The system as claimed in claim 1, wherein said processing unit is configured to determine direction information by analyzing a phase difference of the emitted harmonic signal between said first receiver and said second receiver.

3. The system as claimed in claim 2, wherein said processing unit is configured to determine a location of said device based upon said distance information and said direction information.

4. The system as claimed in claim 3, further comprising a display.

5. The system as claimed in claim 4, further comprising a global positioning system receiver.

6. The system as claimed in claim 5, wherein said location of said device is shown within a graphical interface on said display.

7. The system as claimed in claim 1, wherein said emitted harmonic signal is coherent to said signal when a frequency of said emitted harmonic signal is a whole-number multiple of a frequency of said signal.

8. The system as claimed in claim 1, wherein said signal is at a frequency within said passband of said receiver of said device.

9. The system as claimed in claim 8, wherein said receiver of the device is saturated when an output of an amplifier of the receiver deviates from being a linear function of the signal.

10. The system as claimed in claim 1, wherein said emitted harmonic signal is radiated from a printed circuit board of said device.

* * * * *